United States Patent
Deluca (10) Patent No.: US 9,513,616 B2
(45) Date of Patent: Dec. 6, 2016

(54) SYSTEM AND METHOD FOR CONTROLLING FUNCTIONS ON ELECTRONIC DEVICES

(75) Inventor: Michael Joseph Deluca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 1193 days.

(21) Appl. No.: 12/905,574

(22) Filed: Oct. 15, 2010

(65) Prior Publication Data

US 2012/0092140 A1    Apr. 19, 2012

(51) Int. Cl.
*H01R 13/66*    (2006.01)
*G05B 19/042*    (2006.01)

(52) U.S. Cl.
CPC . *G05B 19/0426* (2013.01); *G05B 2219/23019* (2013.01); *G05B 2219/2615* (2013.01)

(58) Field of Classification Search
CPC .... G01D 5/145; G05G 1/10; H01R 13/6633; H01R 24/58; H01R 2107/00
USPC ................................ 340/12.31; 439/668–669
See application file for complete search history.

(56) References Cited

U.S. PATENT DOCUMENTS

| | | | | |
|---|---|---|---|---|
| 4,593,162 A * | 6/1986 | Rochette | ............... | H01R 24/58 200/336 |
| 6,149,469 A * | 11/2000 | Kim | ............... | 439/668 |
| 6,518,993 B2 * | 2/2003 | Kerai et al. | ............... | 348/14.01 |
| 6,845,408 B1 * | 1/2005 | Lemke et al. | ............... | 710/18 |
| 6,947,766 B2 * | 9/2005 | Chan et al. | ............... | 455/557 |
| 7,800,360 B2 * | 9/2010 | Johansson | ............... | G01D 5/145 200/51.09 |
| 8,106,948 B2 * | 1/2012 | Souma | ............... | 348/158 |
| 8,150,046 B2 * | 4/2012 | Hansson | ............... | H04R 1/1033 381/394 |
| 8,192,234 B2 * | 6/2012 | Wittenberg | ............... | G01D 21/02 439/620.21 |
| 8,573,861 B2 * | 11/2013 | Terlizzi et al. | ............... | 385/92 |
| 8,983,087 B2 * | 3/2015 | You | ............... | H04R 3/00 381/109 |
| 2005/0090141 A1 * | 4/2005 | Peng | ............... | H01R 24/58 439/488 |
| 2005/0201568 A1 * | 9/2005 | Goyal | ............... | 381/74 |
| 2006/0224994 A1 | 10/2006 | Cheemalapati et al. | | |

(Continued)

FOREIGN PATENT DOCUMENTS

| EP | 2224226 | 9/2010 |
|---|---|---|
| JP | 2004014391 | 1/2001 |

(Continued)

OTHER PUBLICATIONS

Kanlis, Angelos; Search Report from corresponding European Application No. 10187824.7; search completed Apr. 15, 2011.

(Continued)

*Primary Examiner* — Hai Phan
*Assistant Examiner* — Son M Tang
(74) *Attorney, Agent, or Firm* — Jon Gibbons; Fleit Gibbons Gutman Bongini & Bianco P.L.

(57) ABSTRACT

A system and method are provided that adapt or configure an electronic device to be capable of detecting movement of the plug of a headset relative to a socket therefore (i.e. be capable of detecting relative movement of the coupling between the headset and the device). The plug can then be used to control functions on the electronic device, including those associated with audio programming. The resultant auxiliary controls can also be used for other applications, even those where the device is actively being used, e.g. a video game, to provide further control inputs for the electronic device.

27 Claims, 7 Drawing Sheets

(56) References Cited

U.S. PATENT DOCUMENTS

2008/0247592 A1* 10/2008 Kourzanov ............... 381/384
2009/0296952 A1* 12/2009 Pantfoerder et al. .......... 381/74

FOREIGN PATENT DOCUMENTS

WO   2007049175   5/2007
WO   2009080079   7/2009

OTHER PUBLICATIONS iDEA for Dummies; Online at http://www.ideafordummies.com/basics.html; Available online at least as early Feb. 16, 2010; Accessed Jul. 8, 2010.

Dolcourt, Jessica; "A joystick for cell phone games | CTIA 2009—CNET Reviews"; Online at http://reviews.cnet.com/8301-12261_7-9913670-51.html; Available online at least as early Feb. 16, 2010; Accessed Jul. 8, 2010.

"Imagine amazing efficiency in one small powerful phone"; Online at http://www.samsung.com/my/consumer/mobile-phone/mobile-phone/business/SGH-I780ZKAFMG/index.idx?pagetype=prd_detail; Available online at least as early Feb. 16, 2010; printer friendly version accessed Mar. 21, 2011 from http://www.samsung.com/my/consumer/detail/productPreviewRead.do?model_cd=SGH-I780ZKAFMG&group=mobile-phone&type=mobile-phone&subtype=business; Samsung.

Russia's Pop-Up Cell Phone Joystick ; Online at http://kotaku.com/#!236391/russias-pop+up-cell-phone-joystick; Available online at least as early Feb. 16, 2010; Accessed Jul. 8, 2010.

A 3D joystick for mobile phones ; Online at http://www.articlesbase.com/videos/5min/196546858; Available online at least as early Feb. 16, 2010; Accessed Jul. 8, 2010.

* cited by examiner

SYSTEM AND METHOD FOR CONTROLLING FUNCTIONS ON ELECTRONIC DEVICES

TECHNICAL FIELD

The following relates to systems and methods for controlling functions on electronic devices.

BACKGROUND

When using a cell phone, PDA, smart phone, or other electronic device, to listen to music or other audio programming, controlling the various functions associated with the audio programming typically requires accessing one or more input devices on the electronic device. In some instances, the electronic device is not immediately accessible, due to it being in a holster, coat pocket, bag, pursue, or otherwise being temporarily stowed. In such instances, controlling the audio programming can be burdensome and become annoying to the user.

BRIEF DESCRIPTION OF THE DRAWINGS

Embodiments will now be described by way of example only with reference to the appended drawings wherein.

DETAILED DESCRIPTION OF THE DRAWINGS

Figures 1, 2:
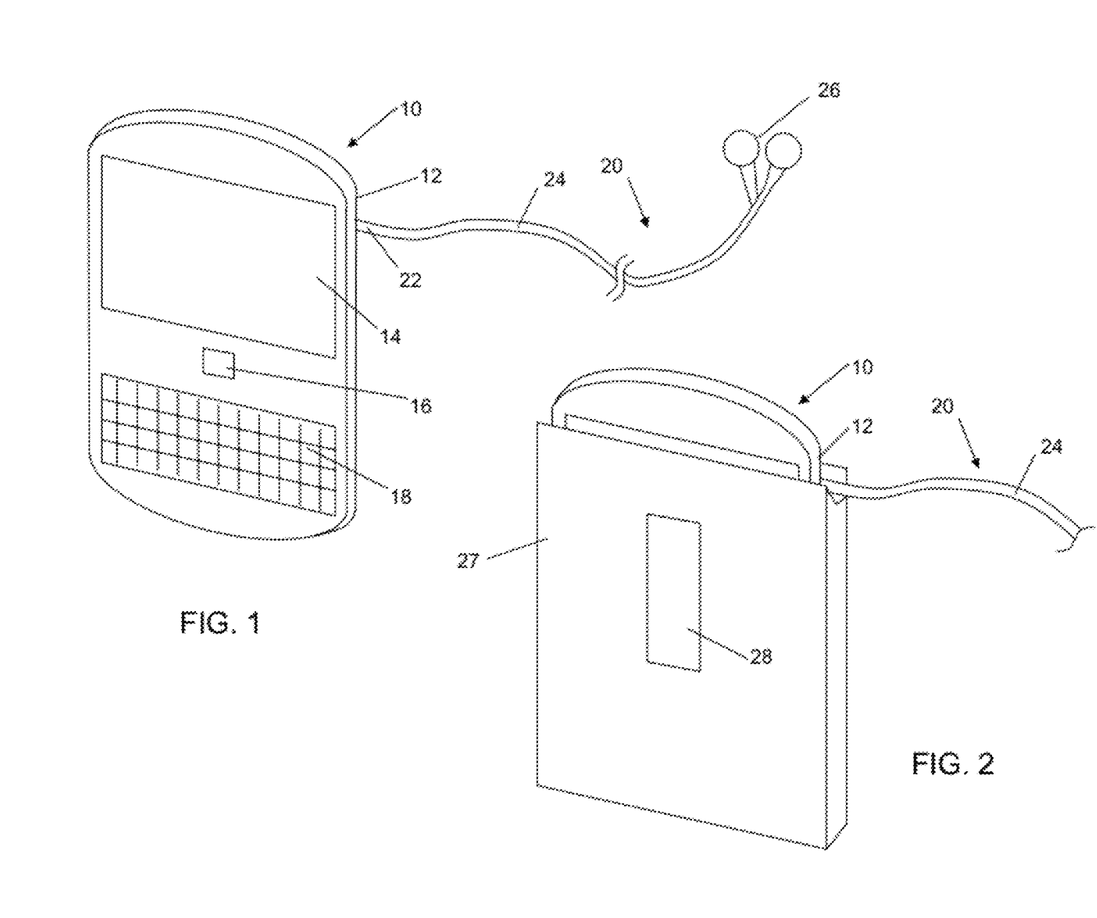
FIG. 1 is a perspective view of a mobile device comprising a wired headset.
FIG. 2 is a perspective view of the mobile device of FIG. 1 stowed in a holster.

When using an electronic device for audio programming while the device is holstered or otherwise stowed, buttons or other input devices needed to operate functions for controlling the audio programming may be obstructed or at least inconvenient to access. It has been recognized that a headset such as a set of headphones is typically used in order to listen to the audio programming and such headset comprises a plug or other mechanism coupled to a socket or jack in the electronic device. Since the plug is needed to use the headset, which is in turn used to listen to the audio programming, the plug is present and in use during times when control of functions for the audio programming is needed. Moreover, when holstered or otherwise stowed, the plug is readily discernible by touch, i.e. can be located without seeing the electronic device, since it protrudes from the housing and holster (if being used) as shown in FIGS. 1 and 2.

By adapting or configuring the electronic device to be capable of detecting movement of the plug of the headset relative to a socket therefore (i.e. be capable of detecting relative movement of the coupling between the headset and the device), the plug can be used to control functions on the electronic device, including those associated with audio programming. The resultant auxiliary controls can also be used for other applications, even those where the device is actively being used, e.g. a video game, to provide further control inputs for the electronic device.

Although the following examples are presented in the context of mobile communication devices, the principles may equally be applied to other devices such as applications running on personal computers, other electronic devices, and the like.

For clarity in the discussion below, mobile communication devices are commonly referred to as "mobile devices" for brevity. Examples of applicable mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities.

Turning now to FIG. 1, a mobile device 10 is shown, which comprises a housing 12. The housing 12 in this example supports a display 14, positioning device 16 (in this example a track-pad), and a keyboard 18. The mobile device 10 in the example shown has coupled thereto, a headset 20. The headset 20 in this example is a wired headset comprising a pair of earphones or "ear buds" 26 and a plug 22 for coupling the headset 20 to the mobile device 10, wherein the plug 22 and earphones 26 are connected via a cord 24 or cable. It can be appreciated that the headset 20 could instead comprise a wireless connection between the plug 22 and the earphones 26 (e.g. to use in place of a Bluetooth or other short-range wireless connection).

As seen in FIG. 2, the mobile device 10 may be of the type that comprises a complementary holster 27. The holster 27 is typically used to stow and protect the outer surfaces of the housing 12, display 14, positioning device 16, keyboard 18, etc. and may be used to trigger other features such as a notification profile, backlight, phone, etc. In this example, the holster 27 comprises a clip 28 to facilitate supporting the holster 27 and thus the mobile device 10 on a belt or other object. The holster 27 permits the plug 22 to protrude from the mobile device 10 and the cord 24 to pass therethrough to facilitate use of the headset 20 when the mobile device 10 is holstered. Therefore, it can be appreciated that the plug 22 is accessible and discernible by touch due to it protruding from the mobile device 10, both when the mobile device 10 is holstered and when it is not.

Since the plug 22 is accessible whenever the headset 20 is coupled to the mobile device 10, the plug 22 is available during those times to control functions by detecting movements thereof. It has been found that by adapting a socket 34 used to couple the plug 22 to the mobile device 10, any headset 20 that uses a complementary plug 22 (e.g. standard plug or otherwise) can be used to provide the input, and thus no modifications to the headset 20 are needed. In this way, even if the user has multiple headsets 20 (e.g. one for phone calls and one for multimedia or gaming), there is no need to modify or purchase a special headset in order to provide one or more additional inputs to the mobile device 10. Two example configurations suitable for adapting the socket 34 are shown in FIGS. 3 and 4.

Figure 3:
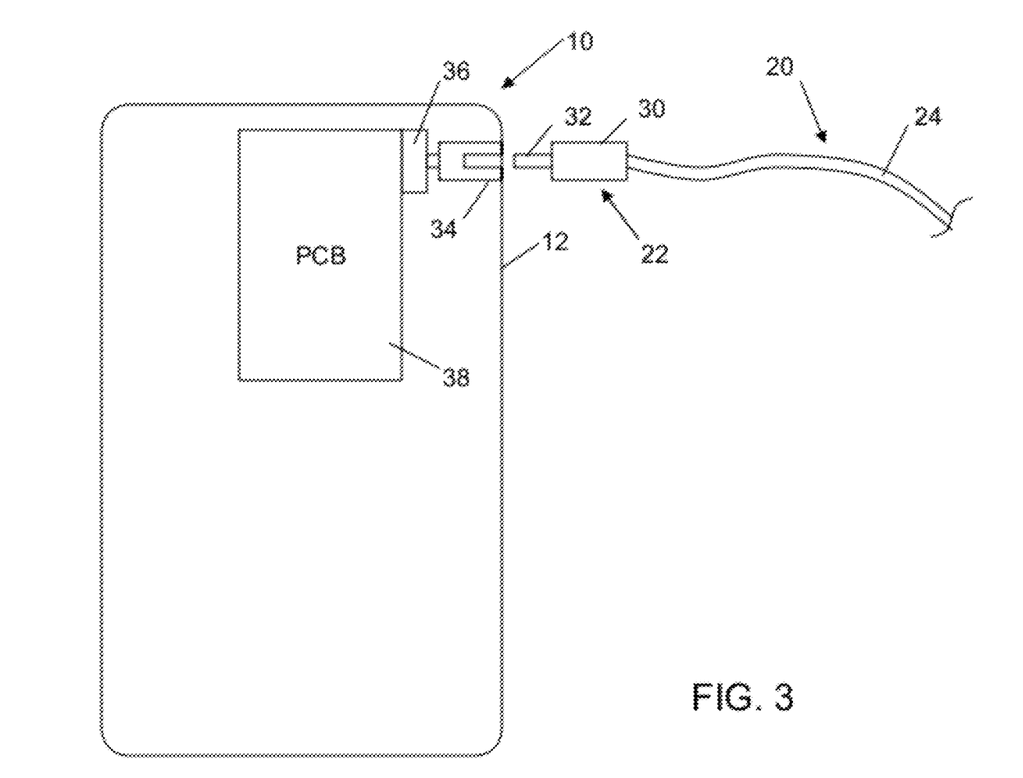
FIG. 3 is a block diagram of a mobile device comprising a joystick for detecting movement of a headset plug with respect to a socket therefore.

In FIG. 3, the socket 34 is supported within the housing 12 by a joystick 36, which is in turn supported or mounted on a printed circuit board (PCB) 38 or other component within the housing 12. The joystick 36 in this example is of the type that is capable of detecting movement in at least two orthogonal directions, e.g. a PSP 1000 3D joystick or similar joystick detection modules used in portable gaming devices. Typically, such a joystick 36 can detect movement in four radial directions (e.g. forward, backward, left, and right). The joystick 36 may, in some embodiments, be configured to detect movement in a third orthogonal direction, namely an axial movement towards the PCB 38. In such embodiments, the joystick 36 can detect five distinct movements, each of which can be translated to one or more instructions for operating a particular corresponding function. For example, if the joystick 36 is used to instruct a music player application, it can detect skip forward and skip backward along one orthogonal axis, volume up and volume down along another orthogonal axis, and pause along the third orthogonal axis, i.e. via an axial movement towards the PCB 38. It will be appreciated that the socket 34 may also be configured to detect rotational movement of the plug 32 relative thereto, however, such movements would typically need to be detectable by the socket 34 in this example as will be discussed below.

It can be appreciated that to accommodate movement of the socket 34, the housing 12 should allow enough clearance surrounding the socket 34. By connecting the socket 34 to a joystick 36 as shown in FIG. 3, movement of a lead 32 of the plug 22 can impart a force on the socket 34, which in turn causes a discernible movement of the joystick 36. It can be seen in FIG. 3 that the plug 22 in this example comprises a body 32 which contains a connection between the cord 24 and the lead 32. The lead 32 is inserted into the socket 34 and the body 30 typically abuts the housing 12 and/or socket 34. Although the joystick 36 is shown as being connected directly to the PCB 38 in FIG. 3, it can be appreciated that the joystick 36 can be supported by any suitable mechanism such as mounting hardware inside the housing 12, etc.

Figure 4:
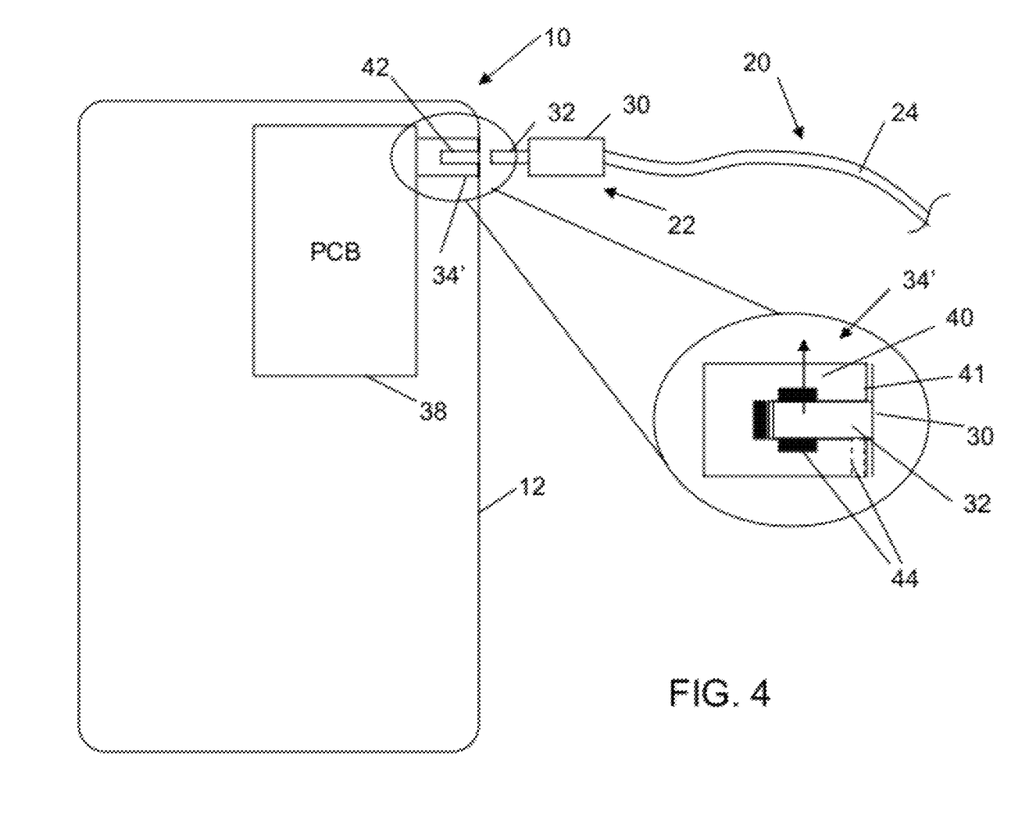
FIG. 4 is a block diagram of a mobile device comprising a headset socket having a series of transducers for detecting movement of a headset plug relative thereto.
Figure 5:
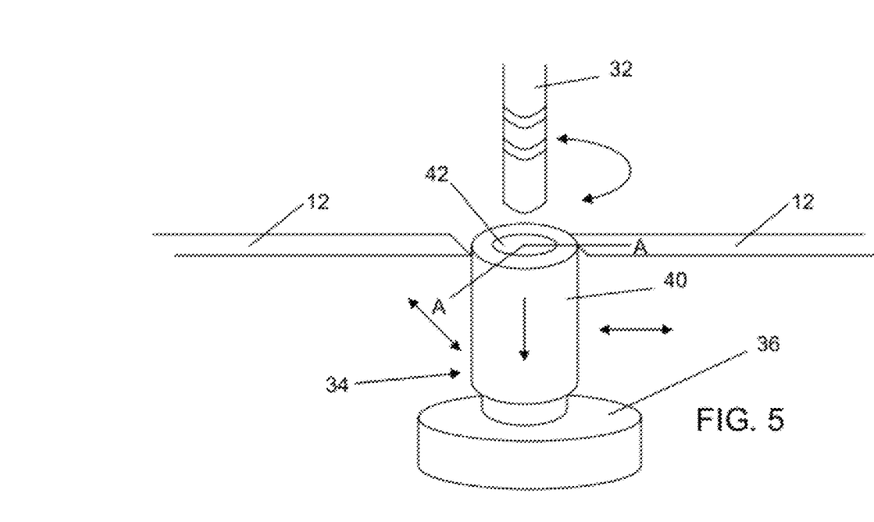
FIG. 5 is an enlarged perspective view of the socket and joystick shown in FIG. 3.

In FIG. 4, the socket 34' itself detects movement of the lead 32 as best shown in the enlarged view of the socket 34'. In this example, the socket 34' comprises one or more transducers 44 that are capable of detecting a pressure or force bearing against a corresponding portion of the wall 40 that defines the socket's interior 42. The transducer 44 may be of any suitable type capable of detecting pressure, force or contact, such as a piezoelectric element, magnetic sensor, or other contact sensor. Each transducer 44 corresponds to a function and is positioned to detect a particular movement of the lead 32. For example, to provide five functions as shown in FIG. 5, five corresponding transducers 44 can be incorporated into the socket 34', namely four spaced around the wall 40, typically at 90 degree offsets, and a fifth positioned at the end of the interior 42 to detect an inward, axial movement of the lead 32. It can be appreciated that if it is expected that the lead 32 may be sized such that it will not reach the end of the interior 42, another transducer 44 may be placed instead of or redundantly (i.e. in addition to), on the ridge 41 of the socket 34' as shown in dashed lines. Such a redundant transducer 44 can be placed in order to detect a force imparted by the body 30 of the plug 22 should the body 30 impact the socket 34' prior to or instead of the lead 32. It can be appreciated that although in this example the socket 34' is shown as being connected directly to the PCB 38, in other embodiments, the socket 34' may be supported using some other component or using mounting hardware within the housing 12.

Accordingly, it can be appreciated that movement of the plug 22 can be detected in various ways, for example by detecting movement of the socket 34 imparted by the movement of the plug 22 as shown in FIGS. 3 and 5, or by adapting the socket 34' to incorporate one or more transducers 44 positioned to detect one or more corresponding movements as shown in FIG. 4.

Figure 6:
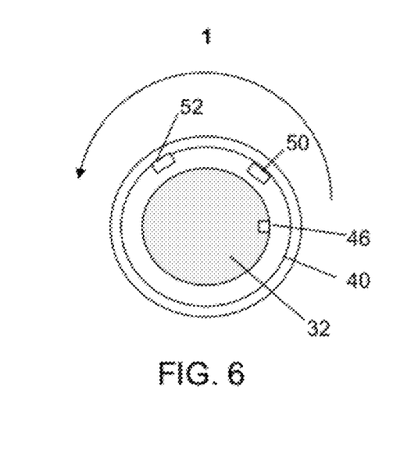
FIGS. 6 to 8 are a series of diagrams illustrating detecting of rotation of a headset plug relative to a socket therefore.
Figure 7:
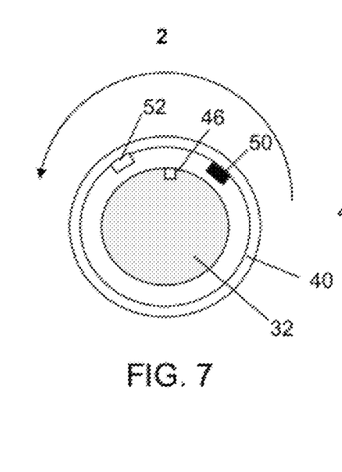
Figure 8:
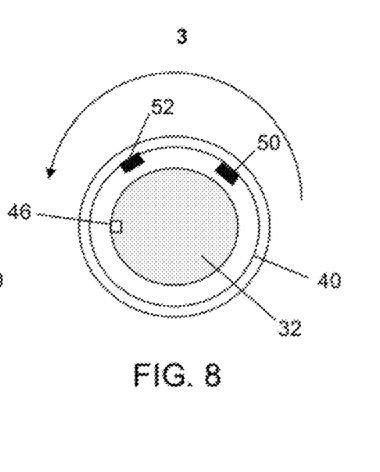

As noted above, the socket 34 can also be optionally adapted to detect rotation of the lead 32 relative thereto in order to provide two additional functions, namely counter-clockwise and clockwise rotations. Returning to the music player example, rotation of the plug 22 may be used to enable fast-forward and fast-reverse/rewind functions. Methods for detecting surface movements indicative of rotation include optical or electromagnetic movement detection or rotation measurement mechanics, e.g. those which are used in computer mouse technologies. In order to detect rotation of the lead 32, the socket 34 in this example is configured to detect rotation of a discernible marking or other detectable feature 46 on the lead 32 to distinguish between clockwise and counter-clockwise movements. For example, FIGS. 6 to 8 illustrate one example configuration capable of discerning clockwise from counter-clockwise rotation. In this example, the lead 32 comprises a detectable element 46, e.g. a marking, magnetic portion, etc. As the detectable element 46 rotates with the lead 32, it will pass a plurality of detectors, in this example a first detector 50 and a second detector 52. In FIG. 7 it can be seen that the detectable element 46 passes the first detector 50 first, followed by the second detector as shown in FIG. 8 thus indicating a counter-clockwise rotation (in the view shown). It can be appreciated that if the second detector 52 detects the detectable element 46 prior to the first detector 50, clockwise rotation is detected. Other embodiments can optically track the rotational movement of the surface of the plug 32 when the plug 32 is rotated within the socket 34. In such embodiments, the detectable or discernible elements 46 comprise visual surface differences.

Accordingly, a system is provided that comprises one or more detectors for detecting movement of a headset plug relative to a socket therefor, in order to enable instructions in a memory to be provided or generated for controlling one or more corresponding functions according to a detected movement by the one or more detectors. A joystick coupled to the socket may comprises the one or more detectors, and/or the one or more detectors can be transducers operable to detect one or more corresponding movements of the plug. The one or more detectors can be positioned with respect to the socket to detect movements of the headset plug relative to the socket along a plurality of orthogonal directions, wherein in some embodiments, at least four detectors are positioned with respect to the socket to detect at least four corresponding directions of movement, a first pair of directions being along a first orthogonal axis and a second pair of directions being along a second orthogonal axis.

In other embodiments, at least one additional detector can be positioned to detect a fifth direction of movement along a third orthogonal axis, the third orthogonal axis being substantially aligned with an axial direction of the socket, and at least one detector can be operable to detect rotation of the plug relative to the socket, for example to detect rotation in both clockwise and counter-clockwise directions.

Figure 9:
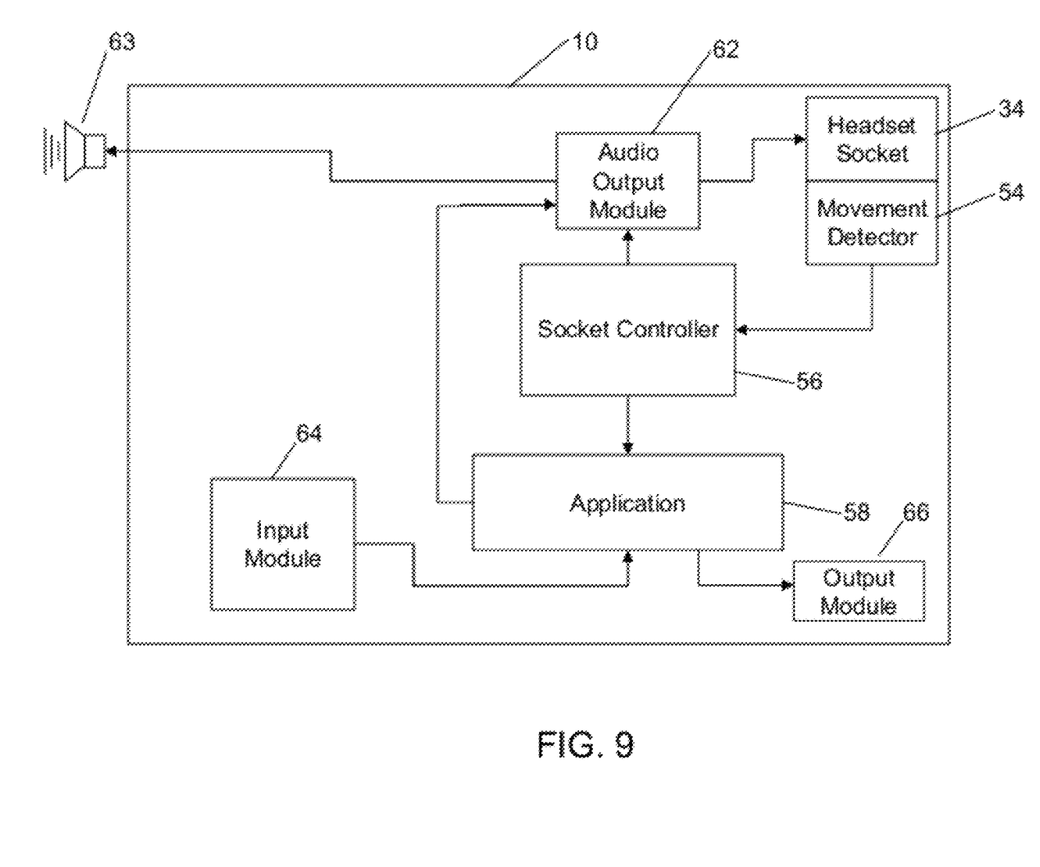
FIG. 9 is a block diagram of an example configuration for controlling functions on a mobile device by detecting movement of a headset plug coupled thereto.

FIG. 9 illustrates an example block diagram of a mobile device 10 comprising a headset socket 34. In this example, the headset socket 34 is connected to or otherwise comprises a movement detector 54, e.g. transducers 44, joystick 36, etc. The movement detector 54 is configured to detect one or more movements of the plug 20 relative to the socket 34 and provide one or more corresponding indications to a socket controller 56. The socket controller 56 is configured to provide one or more instructions to an application 58 for operating one or more corresponding functions. This may be done by simply relaying the indications from the movement detector to an application 58 (i.e. if the application 58 understands such indications), or can perform a translation of the indications into a format that is understandable to the application 58. For example, the following table illustrates an example translation and rotation wherein the movement detector 54 provides indications 1 through 7 and the socket controller 56 translates the indications into functional instructions A through G.

TABLE 1

Example Instruction Mapping

| Indication and Corresponding Motion | Instruction (e.g. for Music Player) |
|---|---|
| 1 - Right (+X axis) | B (next track) |
| 2 - Left (−X axis) | D (previous track) |
| 3 - Up (+Y axis) | A (volume up) |
| 4 - Down (−Y axis) | C (volume down) |
| 5 - Press (−Z axis) | E (pause) |
| 6 - Rotate clockwise | F (fast forward) |
| 7 - Rotate counter clockwise | G (rewind) |

Accordingly, the application 58, such as a music player, will receive an instruction that it understands (on the assumption that the music player understands instructions A to G rather than raw indications 1 to 7). For example, by receiving instruction B, the application 58 may know to skip the track forward, whereas if it receives instruction D, it knows to skip the track backward. Whether or not a translation is required may be application-specific. In another music player embodiment, a combination of actions may be required to improve false interpretations of the operation of the joystick 34 (or detection using transducers 44). For example, an E instruction (press) either in sequence or combination with a B instruction (right) may be required before skipping to the next track. Other such combinations are conceivable whereby the combination may help avoid false interpretation of movement operations in active user environments, such as while jogging or engaging in other physical activities. As such, the socket controller 56 can be configured to determine which of a plurality of applications 58 it is to be currently controlling and adapt itself accordingly. The instructions understandable to the application 58 may correspond to those that are provided by an existing input module 64, e.g. a set of controls provided on the display 14 via an output module 66. The application 58 may include any number of applications designed to interface with a joystick, trackpad, trackball, mouse, touchscreen, or other suitable movement/positioning or other input devices.

The application 58 may therefore be controlled using existing controls provided by the input module 64 or via the movement detector 54. The instructions instruct the application 58 to perform a particular function, which is typically discernible to the user via an audio output module 62. For example, if the instruction provides a volume increase, the audio output module 62 increases the volume directed to the headset socket 34 when the headset 20 is inserted or to the speaker 63 when it is not. The user may thus be inherently notified of a successful operation via a detectable change in the audio output, e.g. new track, higher volume, etc. However, in some cases, or for some applications 58, the instruction may correspond to a function that does not involve inherent audible feedback. For example, the headset 20 may be used to control operations for a video camera on the mobile device 10, for which one movement causes a "record" function to initiate. If the record function is silent to the user, haptic or other feedback can be provided, for example, the socket controller 56 or application 58 can instruct a vibration mechanism to vibrate the mobile device 10. Similarly, a beep or tone can be provided as feedback or a flashing light, etc.

It will be appreciated that any module or component exemplified herein that executes instructions may include or otherwise have access to computer readable media such as storage media, computer readable storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, or accessible or connectable thereto. Any application or module herein described may be implemented using computer readable/executable instructions that may be stored or otherwise held by such computer readable media.

Figure 10:
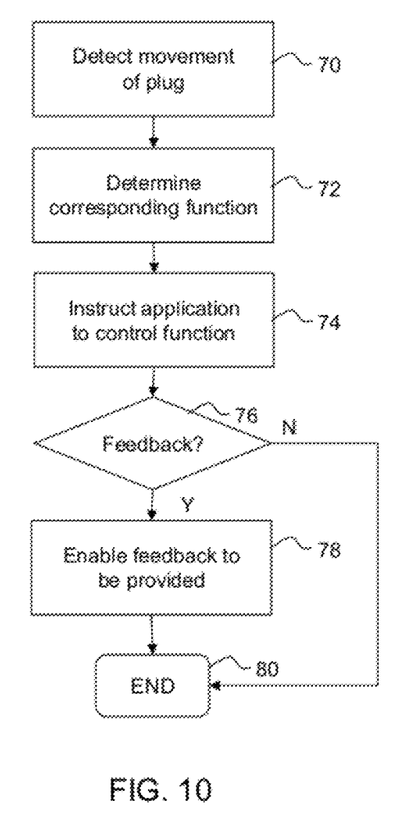
FIG. 10 is a flow chart illustrating an example set of computer executable instructions for controlling functions on a mobile device by detecting movement of a headset plug coupled thereto.

Turning now to FIG. 10, an example set of computer executable instructions are shown that may be executed by the socket controller 56, movement detector 54, or application 58 (if specially programmed to accept inputs from the movement detector or socket 34, 34') to operate one or more functions in response to detected movements of the plug 22 relative to the socket 34, 34'. At 70, movement of the plug 22 is detected, e.g. by the transducers 44, joystick 36, etc. Based on the detected movement at 70, an indication is obtained (e.g. a signal on a particular wire, a code provided by the joystick 36, etc.) and from this indication, the corresponding function is determined at 72. For example, the indication may be in the format understandable by the application 58 or may be translated, e.g. using a table such as Table 1, by the socket controller 56 or movement detector 54. The application 58 is then instructed to control a particular function at 74. It may then be determined at 76 whether or not feedback is to be provided. For example, depending on the nature of the indication and the corresponding function, a discernible feedback is inherent or may need to be generated. If feedback is required, the feedback is enabled and provided at 78, e.g. by causing the mobile device 10 to vibrate, a light to flash, an audible tone to sound, etc. and the process ends at 80. If no feedback is required, the process ends at 80 without providing any feedback.

Figure 11:
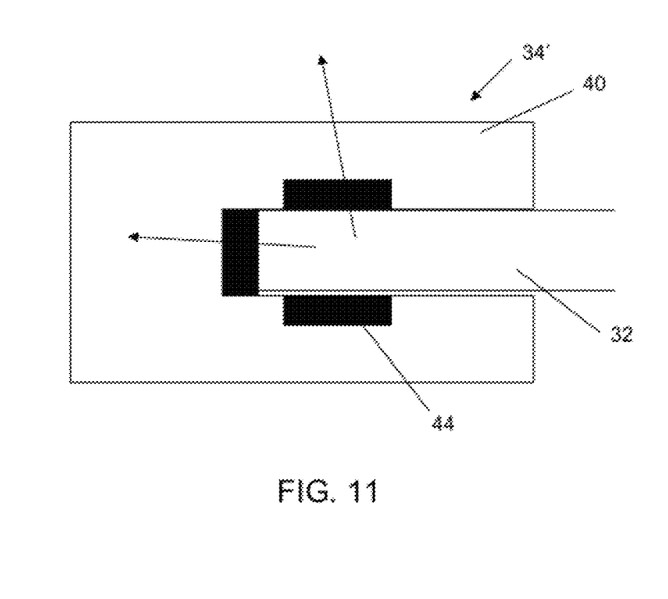
FIG. 11 is an enlarged sectional view of the socket shown in FIG. 4 illustrating detection of dual forces simultaneously.

As discussed above, in addition to detecting pressure or force applied to the inner surfaces of the interior 42 of the socket 34 or detecting movement of the joystick 36 in two orthogonal directions, a third orthogonal direction may be incorporated to detect axial movement or "pushing" of the plug 22 towards the housing 12. It has also been recognized that the provision of such a third orthogonal direction can be used to confirm or qualify a particular movement to discern inadvertent movements of the plug 22 from legitimate ones. As shown in FIG. 11, by requiring both a pushing inwards and towards the socket's interior 42 in a particular direction movement in the particular direction can be qualified. In this way, should the plug 22 be jostled or otherwise moved inadvertently, the corresponding function would not be operated on unless the pushing force is detected.

The above system has many particular advantages. For example, by modifying the socket 34 or attaching the socket 34 to a joystick 36 as shown herein, any conventional wired headset 20 can be used to enable the additional function controls. Such additional function controls can also be used to control any other functions on the mobile device 10. A further advantage is that when the headset 20 is not in use, the control rod that is effectively created by the plug 22 would no longer protrude from the housing 12, since the headset 20 is typically removed when not in use. As such, the additional function controls would be present when needed but removed and thus not "in the way" when they are not needed. Moreover, since only modifications are needed to the mobile device 10, the existing user experience is not changed but is enhanced by having the ability to provide additional controls and modifications to the headset 20 is not needed in most embodiments.

Figure 12:
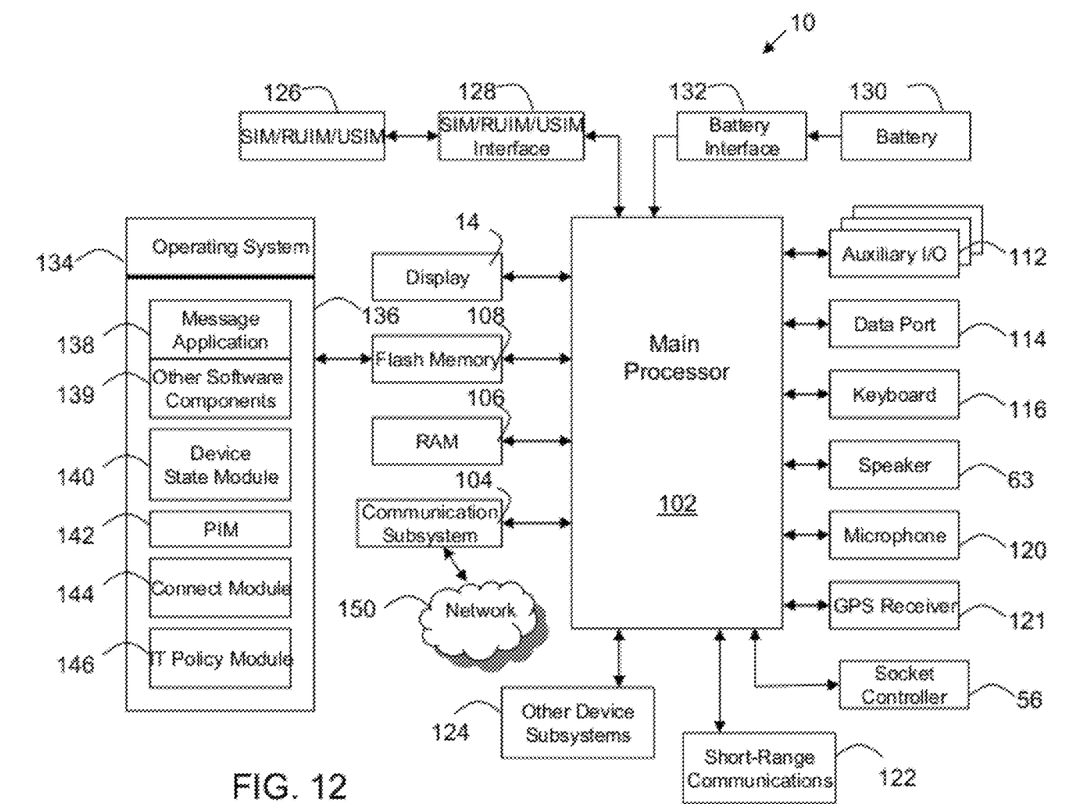
FIG. 12 is a block diagram of an example configuration for a mobile device.

Referring now to FIG. 12, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 150. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 150 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 14, an auxiliary input/output (I/O) subsystem 112, a data port 114, a keyboard 116, a speaker 63, a microphone 120, GPS receiver 121, socket controller 56, short-range communications 122, and other device subsystems 124.

Some of the subsystems of the mobile device 10 perform communication-related functions, whereas other subsystems may provide "resident" or on-device functions. By way of example, the display 14 and the keyboard 116 may be used for both communication-related functions, such as entering a text message for transmission over the network 150, and device-resident functions such as a calculator or task list.

The mobile device 10 can send and receive communication signals over the wireless network 150 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 150. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and may include a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 150. PIM data items may be seamlessly integrated, synchronized, and updated via the wireless network 150 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 150, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 150. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 14 or alternatively to the auxiliary I/O subsystem 112. A subscriber may also compose data items, such as e-mail messages, for example, using the keyboard 116 in conjunction with the display 14 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 150 through the communication subsystem 104.

For voice communications, the overall operation of the mobile device 10 in this example is substantially similar, except that the received signals are output to the speaker 63, and signals for transmission are generated by the microphone 120. Alternative voice or audio I/O subsystems, such as a voice message recording subsystem, can also be implemented on the mobile device 10. Although voice or audio signal output is accomplished primarily through the speaker 63, the display 14 can also be used to provide additional information such as the identity of a calling party, duration of a voice call, or other voice call related information.

The socket controller 56 is also shown in FIG. 12 and may operate in conjunctions with or under the controller of the main processor 102 to provide instructions indicative of detected movements of the socket 34 due to movements of the plug 22. The socket controller 56 may also utilize or otherwise instruct the processor 102 to provide feedback via the speaker 63 and to instruct an application 58 to operate or otherwise control a function related to the use of the application 58, e.g. volume control or track selection in a music application. As such, it can be appreciated that the configuration shown in FIG. 9 can be adapted to operate within various electronic devices, including a mobile device 10 as shown in FIG. 12 and others.

Although the above principles have been described with reference to certain specific embodiments, various modifications thereof will be apparent to those skilled in the art without departing from the scope of the claims appended hereto.

The invention claimed is:

1. A system for controlling functions on an electronic device, the system comprising:
  a first detector being positioned at an end of an interior of a socket for a headset plug having a lead and a body for detecting a pushing force of the headset plug into the socket in a third orthogonal direction along an axial direction of the headset plug, and
  a second detector being positioned on a ridge of the socket to detect a force imparted by the body of the headset plug when the lead is inserted into the socket along at least one of a first orthogonal direction and a second orthogonal direction perpendicular to the axial direction; and
  instructions in a memory for controlling one or more corresponding functions according to a detected movement by both the first and second detectors, wherein
  the first and second detectors both detect movement of the headset plug by detecting at least one of the lead contacting the end of the socket and the body contacting the socket, and
  the instructions are operable to require detection of a combination of a first movement using the first detector and a second movement using the second detector, the first movement is used to confirm the second movement, and control of a corresponding one of the one or more functions, and the pushing force is an additional axial force on the headset plug after the headset plug is completely inserted into the socket.

2. The system according to claim 1, wherein the first and second detectors are transducers operable to detect one or more corresponding movements of the plug.

3. The system according to claim 1, further comprising one or more detectors positioned with respect to the socket to detect movements of the headset plug relative to the socket along a plurality of orthogonal directions.

4. The system according to claim 3, wherein at least four additional detectors are positioned with respect to the socket to detect at least four additional corresponding directions of movement, a first additional pair of directions being along a first orthogonal axis and a second pair of additional directions being along a second orthogonal axis.

5. The system according to claim 4, wherein one or more of the first and second detectors is positioned to detect a fifth direction of movement along a third orthogonal axis, the third orthogonal axis being substantially aligned with an axial direction of the socket.

6. The system according to claim 1 further comprising at least one detector to detect rotation of the plug relative to the socket.

7. The system according to claim 6, wherein the first detector is operable to detect rotation is operable to detect both clockwise and counter-clockwise rotations.

8. The system according to claim 1 wherein
  the first detector detects a Z axis force imparted towards the end of the interior of the socket based upon the first movement,
  the second detector detect an X axis or Y axis force imparted by the body of the headset plug based upon the second movement, and
  the one of the one or more functions is not executed based upon only one of the first and second movements.

9. The system according to claim 1 further comprising at least one detector to detect an axial rotation of the body of the headset plug based upon first movement, wherein
  the second detector detect an X axis or Y axis force imparted by the body of the headset plug based upon the second movement, and
  the one of the one or more functions is not executed based upon only one of the first and second movements.

10. A method for controlling functions on an electronic device, the method comprising:
  detecting
    a pushing force on a headset plug having a lead and a body at least one of a first detector being positioned at an end of an interior of a socket, the pushing force is in a third orthogonal direction along an axial direction of the headset plug into the socket, and
    a force along at least one of a first orthogonal direction and a second orthogonal direction perpendicular to the axial direction imparted by the body of the headset plug using a second detector being positioned on a ridge of the socket when the lead is inserted into the socket, wherein the first and second detectors both detect movement of the headset plug by detecting at least one of the lead contacting the end of the socket and the body contacting the socket;
  determining a corresponding function to control based on the movement detected;
  providing an instruction to an application to control the corresponding function; and
  detecting a combination of a first movement using the first detector and a second movement using the second detector, the first movement is used to confirm the second movement, and control of a corresponding one of the one or more functions, and the pushing force is an additional axial force on the headset plug after the headset plug is completely inserted into the socket.

11. The method according to claim 10, wherein movements of the headset plug are detected using a plurality of transducers.

12. The method according to claim 10, wherein movements of the headset plug relative to the socket are detectable along a plurality of orthogonal directions.

13. The method according to claim 12, wherein at least four directions of movement are detectable, a first pair of additional directions being along a first orthogonal axis and a second pair of additional directions being along a second orthogonal axis.

14. The method according to claim 13, wherein the first and second detectors detect a fifth direction of movement is detectable along a third orthogonal axis, the third orthogonal axis being substantially aligned with an axial direction of the socket.

15. The method according to claim 10, wherein rotation of the plug relative to the socket is detectable.

16. The method according to claim 15, wherein the rotation is detectable in both clockwise and counter-clockwise directions.

17. The method according to claim 10 wherein
the first detector detects a Z axis force imparted towards the end of the interior of the socket based upon first movement,
the second detector detect an X axis or Y axis force imparted by the body of the headset plug based upon the second movement, and
the one of the one or more functions is not executed based upon only one of the first and second movements.

18. The method according to claim 10 further comprising at least one detector to detect an axial rotation of the body of the headset plug based upon first movement, wherein
the second detector detect an X axis or Y axis force imparted by the body of the headset plug based upon the second movement, and
the one of the one or more functions is not executed based upon only one of the first and second movements.

19. A non-transitory computer readable storage medium comprising computer executable instructions for controlling functions on an electronic device, the computer executable instructions comprising instructions for:
detecting
a pushing force on a headset plug having a lead and a body using at least one of a first detector being positioned at an end of an interior of a socket, the pushing force is in a third orthogonal direction along an axial direction of the headset plug into the socket, and
a force along at least one of a first orthogonal direction and a second orthogonal direction perpendicular to the axial direction imparted by the body of the headset plug using a second detector being positioned on a ridge of the socket when the lead is inserted into the socket, wherein the first and second detectors both detect movement of the headset plug by detecting at least one of the lead contacting the end of the socket and the body contacting the socket;
determining a corresponding function to control based on the movement detected;
providing an instruction to an application to control the corresponding function; and
further comprising instructions for detecting a combination of a first movement using the first detector and a second movement using the second detector the first movement is used to confirm the second movement and control of a corresponding one of the one or more functions, and the pushing force is an additional axial force on the headset plug after the headset plug is completely inserted into the socket.

20. The non-transitory computer storage readable medium according to claim 19, wherein movements of the headset plug are detected using a plurality of transducers.

21. The non-transitory computer storage readable medium according to claim 19, wherein movements of the headset plug relative to the socket are detectable along a plurality of orthogonal directions.

22. The non-transitory computer readable storage medium according to claim 21, wherein at least four directions of movement are detectable, a first pair of additional directions being along a first orthogonal axis and a second pair of additional directions being along a second orthogonal axis.

23. The non-transitory computer readable storage medium according to claim 22, wherein the first and second detectors detect a fifth direction of movement is detectable along a third orthogonal axis, the third orthogonal axis being substantially aligned with an axial direction of the socket.

24. The non-transitory computer readable storage medium according to claim 19, wherein rotation of the plug relative to the socket is detectable.

25. The non-transitory computer readable storage medium according to claim 24, wherein the rotation is detectable in both clockwise and counter-clockwise directions.

26. The non-transitory computer storage readable medium according to claim 19 wherein
the first detector detects a Z axis force imparted towards the end of the interior of the socket based upon first movement,
the second detector detect an X axis or Y axis force imparted by the body of the headset plug based upon the second movement, and
the one of the one or more functions is not executed based upon only one of the first and second movements.

27. The non-transitory computer storage readable medium according to claim 19 further comprising at least one detector to detects an axial rotation of the body of the headset plug based upon first movement, wherein
the second detector detect an X axis or Y axis force imparted by the body of the headset plug based upon the second movement, and
the one of the one or more functions is not executed based upon only one of the first and second movements.

* * * * *